United States Patent
Yang

(10) Patent No.: US 9,726,908 B2
(45) Date of Patent: Aug. 8, 2017

(54) OPTICAL DEVICE FOR RESTORING EYESIGHT

(71) Applicant: Wonjong Yang, Jeju-si (KR)

(72) Inventor: Wonjong Yang, Jeju-si (KR)

( * ) Notice: Subject to any disclaimer, the term of this patent is extended or adjusted under 35 U.S.C. 154(b) by 93 days.

(21) Appl. No.: 14/855,398

(22) Filed: Sep. 16, 2015

(65) Prior Publication Data

US 2016/0109727 A1  Apr. 21, 2016

(30) Foreign Application Priority Data

Oct. 20, 2014  (KR) .......................... 10-2014-0142048

(51) Int. Cl.
*G02C 7/08* (2006.01)
*A61H 5/00* (2006.01)

(52) U.S. Cl.
CPC ............... *G02C 7/088* (2013.01); *A61H 5/00* (2013.01); *G02C 7/08* (2013.01); *A61H 2201/1604* (2013.01); *A61H 2201/165* (2013.01); *G02C 2202/10* (2013.01); *G02C 2202/24* (2013.01)

(58) Field of Classification Search
CPC ...... G02C 7/08; G02C 7/088; G02C 2202/10; G02C 2202/24; A61H 5/00; A61H 2201/1604; A61H 2201/165
USPC ................. 359/763–770; 351/159.7, 159.78
See application file for complete search history.

(56) References Cited

U.S. PATENT DOCUMENTS

| | | | | |
|---|---|---|---|---|
| 4,367,010 A * | 1/1983 | Broome | ................. | G02B 23/00 359/425 |
| 4,429,959 A * | 2/1984 | Walters | ................. | G02C 7/088 351/158 |
| 4,822,994 A * | 4/1989 | Johnson | ................. | F41G 1/38 250/214 VT |
| 4,834,525 A * | 5/1989 | Vansaghi | ................. | G02B 7/002 351/158 |
| 5,455,645 A * | 10/1995 | Berger | ................. | A61B 3/103 351/223 |
| 5,515,209 A * | 5/1996 | Buchroeder | ................. | G02B 7/002 359/362 |
| 6,061,189 A * | 5/2000 | Caplan | ................. | G02B 7/002 351/158 |
| 6,201,640 B1 * | 3/2001 | Caplan | ................. | G02B 7/002 351/158 |
| 6,411,435 B1 * | 6/2002 | Hall | ................. | G02B 25/04 359/359 |
| 7,742,228 B2 * | 6/2010 | Fiedler | ................. | G02B 23/145 359/422 |

(Continued)

*Primary Examiner* — William R Alexander
(74) *Attorney, Agent, or Firm* — Revolution IP, PLLC

(57) ABSTRACT

Disclosed herein is an optical device for restoring eyesight, which includes a first tube configured such that a first convex lens having a first focal length is installed to an inner peripheral surface of a fore-end thereof, a second tube inserted into the first tube so as to move forward and backward within the first tube while a first concave lens having a second focal length and a second concave lens having a third focal length are installed to an inner peripheral surface of a fore-end thereof, a third tube configured such that a third concave lens having a fourth focal length and a fourth concave lens having a fifth focal length are installed to an inner peripheral surface of a fore-end thereof, a fixing unit for fixing the second tube to the third tube, and a fourth tube fixed to the fixing unit to cover the second tube.

9 Claims, 4 Drawing Sheets

(56) References Cited

U.S. PATENT DOCUMENTS

| | | | |
|---|---|---|---|
| 2003/0142263 A1* | 7/2003 | Caplan | G02B 7/002 351/57 |
| 2008/0094731 A1* | 4/2008 | Edwards | G02B 23/00 359/744 |
| 2009/0231699 A1* | 9/2009 | Nakamura | G02B 7/002 359/481 |
| 2010/0177376 A1* | 7/2010 | Arnold | G02B 3/0087 359/307 |
| 2011/0085253 A1* | 4/2011 | Takano | G02B 7/102 359/700 |

* cited by examiner

OPTICAL DEVICE FOR RESTORING EYESIGHT

CROSS REFERENCE TO PRIOR APPLICATIONS

This application claims under 35 U.S.C. §119(a) the benefit of Korean Patent Application No. 10-2014-0142048 filed on Oct. 20, 2014, the entire contents of which are incorporated herein by reference.

BACKGROUND OF THE INVENTION

Field of the Invention

The present invention relates to an optical device for restoring eyesight, and more particularly to an optical device capable of restoring eyesight by enabling an object to be significantly minimized and clearly visible using one convex lens and four concave lenses, and by allowing a person with poor eyesight to see the object such that the object looks small and far away.

Description of the Related Art

When looking at books closely or watching TV from a close distance, a crystalline lens becomes thick in order to better see a close object. However, when looking at an object at a close distance repeatedly or for a long time, the thickened crystalline lens is not restored to its original state. In this case, near-sightedness develops.

In near-sightedness, since a crystalline lens becomes thick and the image of an object is focused in front of the retina, the image looks large and blurry.

In such cases, near-sighted patients wear corrective eyewear having concave lenses in order to compensate for the increased thickness of the crystalline lens. However, there is a problem in that, since an object is can be seen well only when the eyeglasses are worn, the ability of the crystalline lens to return to its original state is further deteriorated, and the crystalline lens hardens in the thickened state.

SUMMARY OF THE INVENTION

Therefore, the present invention has been made in view of the above problems, and it is an object of the present invention to provide an optical device that helps persons with poor eyesight to more conveniently undergo therapy such that an object looks small and far away, and also to provide an optical device capable of restoring eyesight by enabling an object to be significantly minimized and clearly visible using one convex lens and four concave lenses, and by allowing a person with poor eyesight to see the object such that the object looks small and far away.

In accordance with the present invention, the above and other objects can be accomplished by the provision of an optical device for restoring eyesight, which includes a first tube configured such that a first convex lens having a first focal length is installed to an inner peripheral surface of a fore-end thereof, a second tube inserted into the first tube so as to move forward and backward within the first tube while a first concave lens having a second focal length and a second concave lens having a third focal length are installed to an inner peripheral surface of a fore-end thereof, a third tube configured such that a third concave lens having a fourth focal length and a fourth concave lens having a fifth focal length are installed to an inner peripheral surface of a fore-end thereof, a fixing unit for fixing the second tube to the third tube, and a fourth tube fixed to the fixing unit to cover the second tube.

The fourth focal length of the third concave lens installed to the third tube may be equal to the fifth focal length of the fourth concave lens, and the third and fourth concave lenses may be fixedly installed at a regular interval.

The first tube may have a first coupling portion formed on the inner peripheral surface of the fore-end thereof, and the second tube may have a second coupling portion formed on an outer peripheral surface of the fore-end thereof, thereby allowing the first and second tubes to be coupled to each other.

The second coupling portion may protrude in a spiral direction, and the first coupling portion may be a groove for receiving the second coupling portion, protruding in the spiral direction, such that the second tube moves forward and backward within the first tube while rotating in a clockwise or counterclockwise direction.

The outer peripheral surface of the fore-end of the first tube may be formed with a scale such that a user adjusts positions of the second and third tubes according to eyesight thereof.

The optical device may further include a cap which is applied to one end surface of the third tube in order to perform at least one of amblyopia training, astigmatism training, and an object reduction function.

The optical device may further include an eyeglass lens having an opening portion formed in a central portion thereof such that a portion of the first tube is inserted into the eyeglass lens, and a coupling ring for allowing the first tube, a portion of which is inserted into the eyeglass lens, to be coupled thereto.

The optical device may further include an eyeglass body made to be worn on a user's face, and an eyeglass lens fixing unit for fixing the eyeglass lens to the eyeglass body.

The eyeglass lens and the first, second, third, and fourth tubes may be formed in pairs, ones of which are respectively located at left and right sides of the optical device, and the optical device may further include a leveling unit for horizontally fixing the first, second, third, and fourth tubes.

The second tube may have the same diameter as the third tube.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to embodiments, examples of which are illustrated in the accompanying drawings. However, the present invention may be embodied in many different forms and should not be construed as limited to the embodiments set forth herein. Rather, these embodiments are provided so that this disclosure will be thorough and complete, and will fully convey the scope of the present invention to those skilled in the art.

The drawings are not necessarily to scale and in some instances, the relative dimensions and proportions may have been exaggerated in order to clearly illustrate the features of the embodiments. Wherever possible, the same reference numbers will be used throughout the drawings to refer to the same or like parts.

The embodiments specifically illustrate ideal examples of the present invention. Therefore, various modifications can be made in the present invention. Thus, the following description will be given centering on specific forms, but the present invention is not limited thereto and any other forms, for example a manufacturing method, may be used to represent the same forms.

Figure 1:
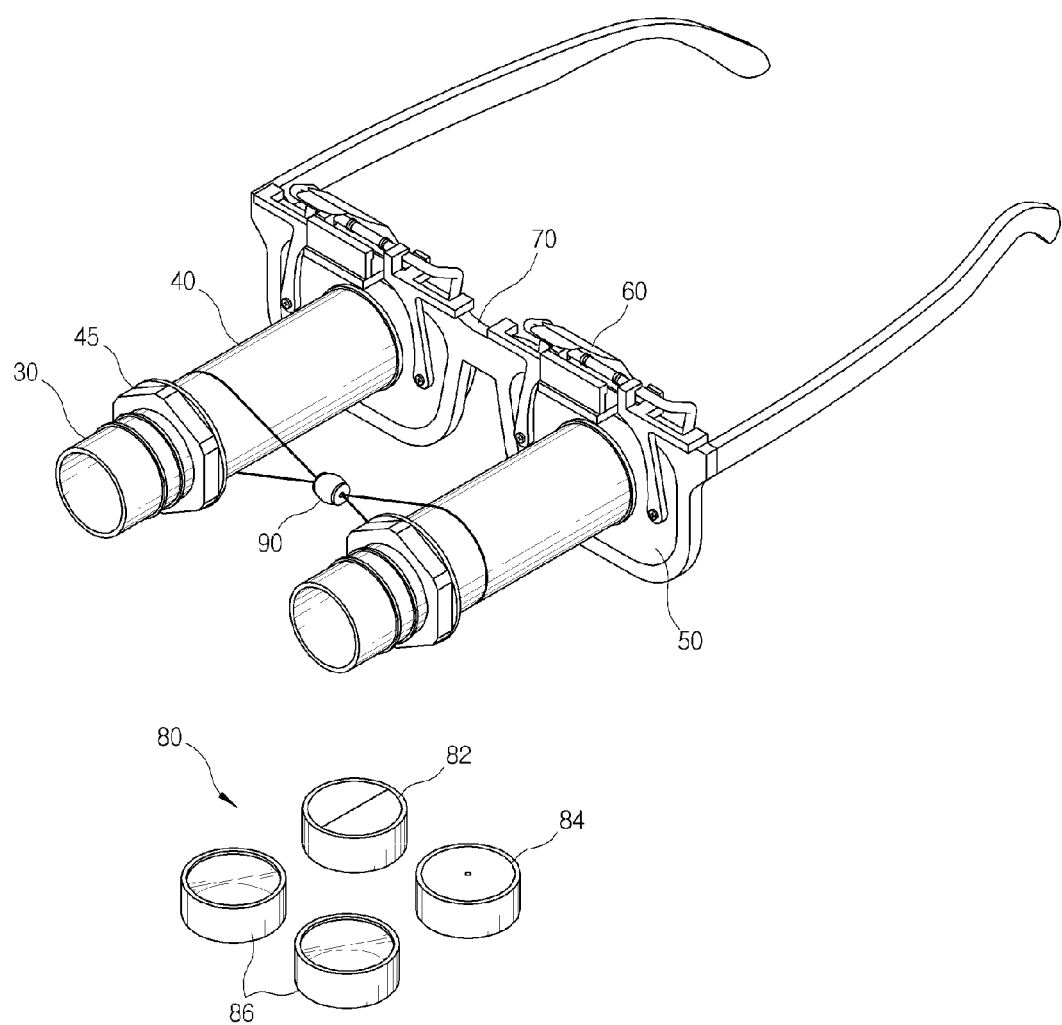
FIG. 1 is a view illustrating an optical device for restoring eyesight and parts relevant thereto according to an embodiment of the present invention.

FIG. 1 is a view illustrating an optical device for restoring eyesight and parts relevant thereto according to an embodiment of the present invention.

Figure 2:
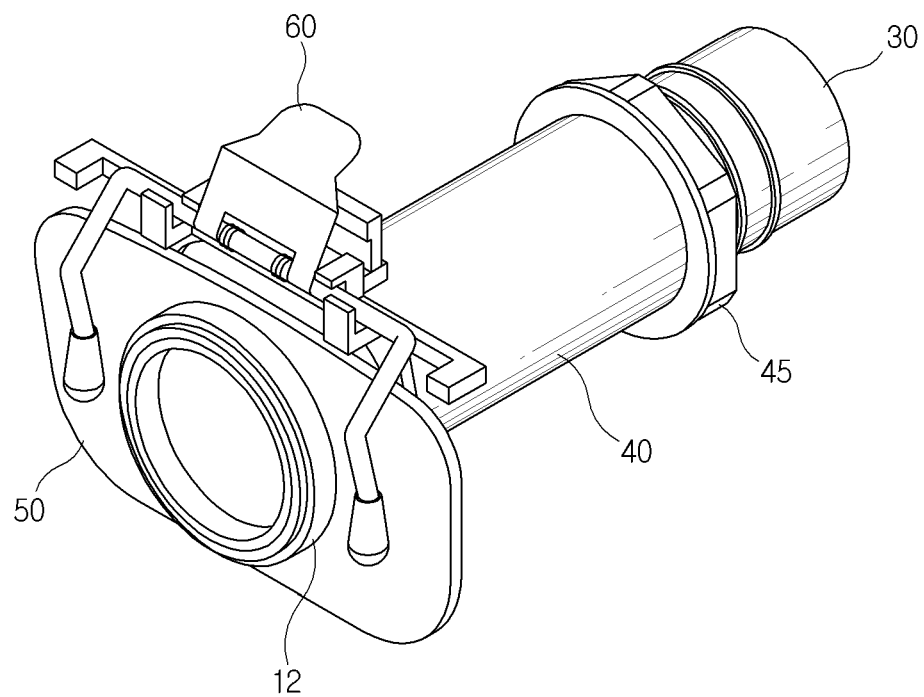
FIG. 2 is a view illustrating the optical device for restoring eyesight when viewed from the back according to the embodiment of the present invention.

FIG. 2 is a view illustrating the optical device for restoring eyesight when viewed from the back according to the embodiment of the present invention.

Figure 3:
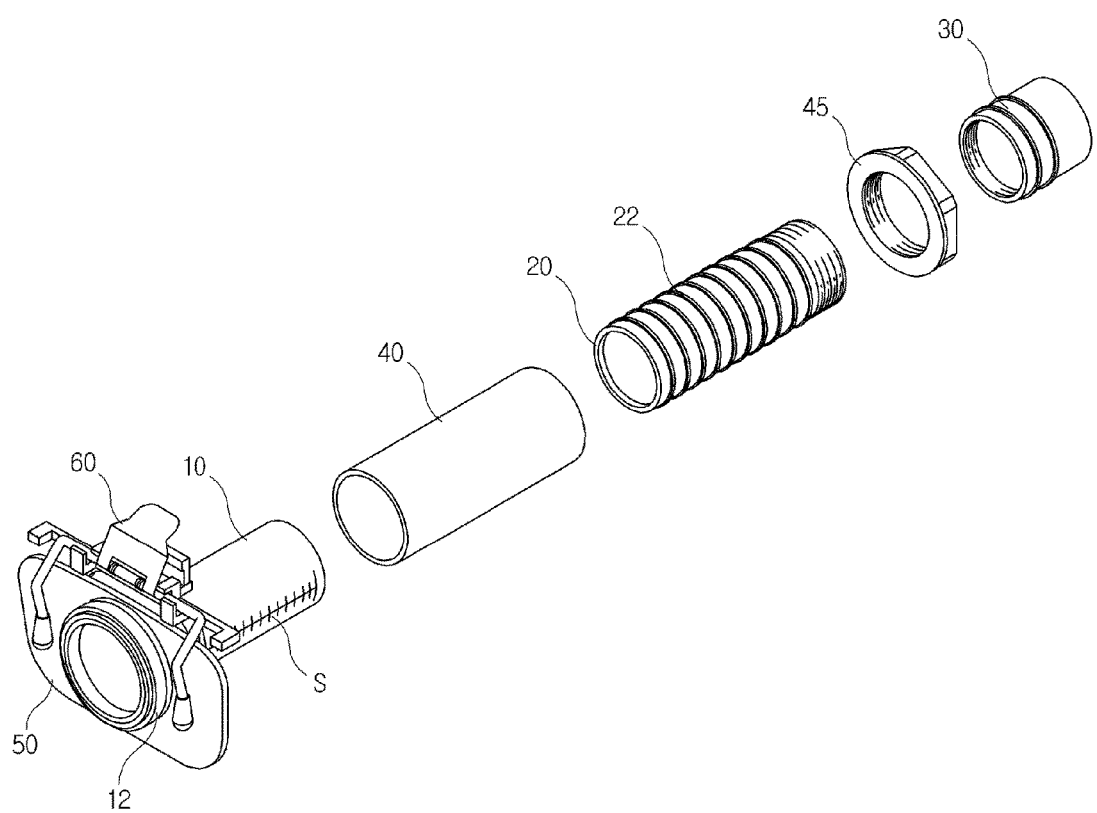
FIG. 3 is an exploded perspective view illustrating the optical device for restoring eyesight according to the embodiment of the present invention.

FIG. 3 is an exploded perspective view illustrating the optical device for restoring eyesight according to the embodiment of the present invention.

Figure 4:
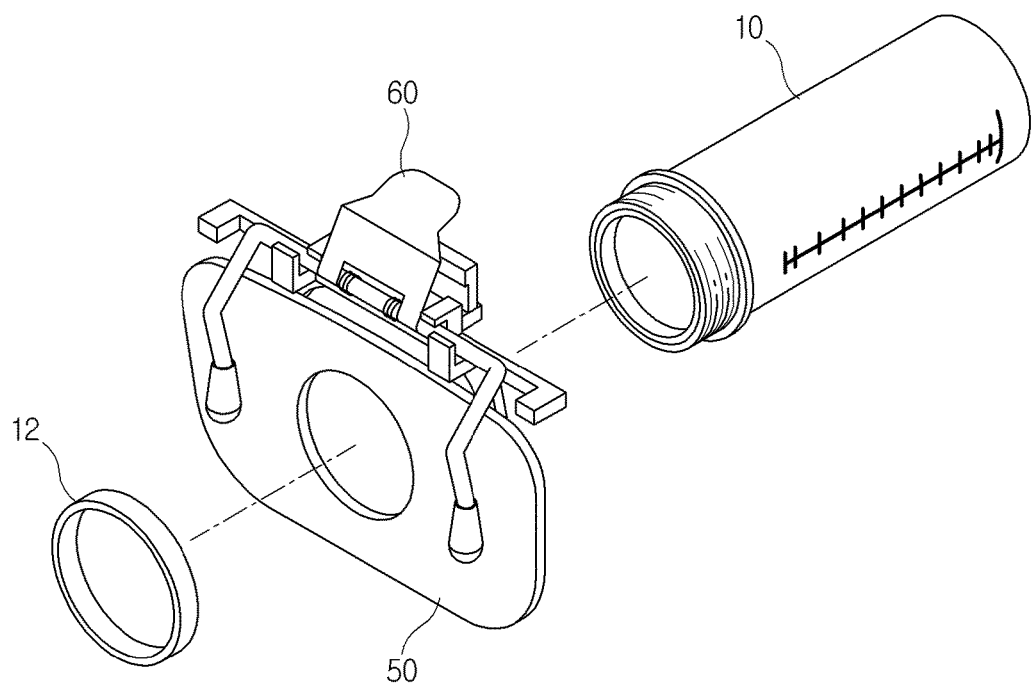
FIG. 4 is a view illustrating a state in which an eyeglass lens of the optical device for restoring eyesight is coupled to a first tube using a coupling ring.

FIG. 4 is a view illustrating a state in which an eyeglass lens of the optical device for restoring eyesight is coupled to a first tube using a coupling ring.

Figure 5:
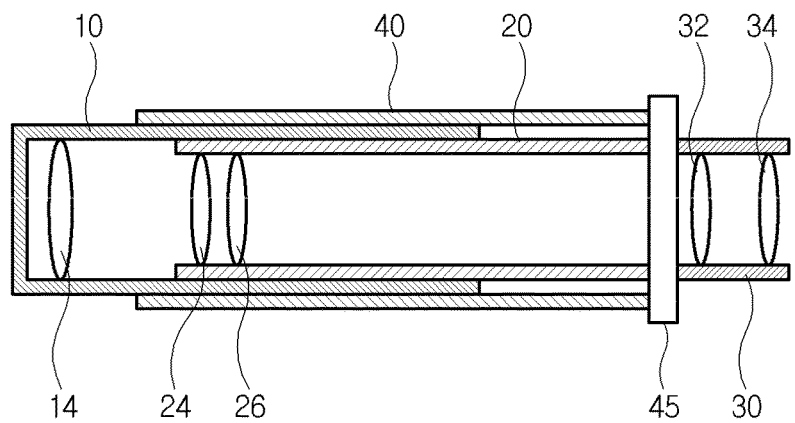
FIG. 5 is a cross-sectional view of the optical device for restoring eyesight according to the embodiment of the present invention.

FIG. 5 is a cross-sectional view of the optical device for restoring eyesight according to the embodiment of the present invention.

The optical device for restoring eyesight according to the embodiment of the present invention includes a first tube 10 configured such that a first convex lens 14 having a first focal length is installed to the inner peripheral surface of the fore-end thereof, a second tube 20 which is inserted into the first tube 10 so as to move forward and backward within the first tube 10 while a first concave lens 24 having a second focal length and a second concave lens 26 having a third focal length are installed to the inner peripheral surface of the fore-end thereof, a third tube 30 configured such that a third concave lens 32 having a fourth focal length and a fourth concave lens 34 having a fifth focal length are installed to the inner peripheral surface of the fore-end thereof, a fixing unit 45 for fixing the second tube 20 to the third tube 30, and a fourth tube 40 which is fixed to the fixing unit 45 to cover the second tube 20.

The optical device according to the present invention allows human eyes to see an image which is ⅛ of the size of the actual object. That is, the optical device allows a ball pen having a length of 12 cm to appear as though it is a ball pen having a length of 1.5 cm, which is a ratio of 8 times (12/1.5=8).

The lenses used for the present invention may be largely classified into an ocular lens, an intermediate lens, and an objective lens. The ocular lens includes a first convex lens, the intermediate lens includes first and second concave lenses, and the objective lens includes third and fourth concave lenses. Here, when the first convex lens having a power of 14 diopters is used as the ocular lens, the focal length of light is 7.14 cm (100/=7.14). However, since human eyes see the outside world through a magnifier having a power of 50 myodiopters, the internal focal length when an object is seen by the human eyes using the optical device differs from the focal length of light, which is 7.14 cm in the first convex lens, having a power of 14 diopters, which is used as the ocular lens. An image is focused on the retina by refraction of light through a keratolenticular magnifier, and the light reflected from the retina passes through the keratolenticular magnifier again, so that the image is magnified and the light is simultaneously refracted. In this state, when an ocular magnifier is used, the refracted light passes through the ocular magnifier again. Therefore, the focal length of light when the eye magnifier is added to the ocular lens is shorter than the refractive focal length of light in a simple ocular lens. To resolve this problem, the present invention provides an optical device that is characterized in particular in that it has a scale S marked on the outer peripheral surface of the fore-end of the first tube. The scale S of the optical device has been devised by repeating experiments on focal lengths many times such that an image looks clear in the state in which a 14-diopter convex lens is put in front of the eye of a person with poor eyesight, on the basis of normal vision (a 14-diopter ocular lens).

The optical device for restoring eyesight according to the present invention is used in the state in which the optical device is worn on the face as though wearing regular eyeglasses. Therefore, it may be uncomfortable to use if the device is too long. Accordingly, the first and second concave lenses may be attached to each other in the state in which the distance therebetween is as small as possible (they may also be replaced with high-powered lenses), and may then be formed inside the second tube.

The fixing unit 45 helps attach the second, third, and fourth tubes to the first tube, in the state in which the first tube is fixed to the eyeglass lens, such that they move together.

In addition, the fourth focal length of the third concave lens 32 installed to the third tube 30 is equal to the fifth focal length of the fourth concave lens 34. Thus, the third and fourth concave lenses 32 and 34 may be fixedly installed at a regular interval.

The third and fourth concave lenses are formed inside the third tube, and may be spaced apart from or may be attached to each other. In the present invention, the lenses may be fixedly installed such that the distance between the respective lenses is 5 mm.

In addition, the first tube 10 has a first coupling portion 16 which is formed on the inner peripheral surface of the fore-end thereof, and the second tube 20 has a second coupling portion 22 which is formed on the outer peripheral surface of the fore-end thereof. Accordingly, the first and second tubes 10 and 20 may be coupled to each other by the first and second coupling portions 16 and 22.

In addition, the second coupling portion 22 protrudes in a spiral direction. The first coupling portion 16 may be a groove for receiving the second coupling portion 22 protruding in the spiral direction such that the second tube 20 may move forward and backward within the first tube 10 while rotating in a clockwise or counterclockwise direction.

The second coupling portion, which is the spirally protruding portion, and the first coupling portion, which is the groove for receiving the second coupling portion, may allow the second tube to more smoothly move forward and backward. As illustrated in FIG. 3, in the case where the first and second coupling portions are formed, the length of the second tube may extend when the second tube rotates in the clockwise direction, and one end of the second tube may move toward the eyeglass lens when the second tube rotates in the counterclockwise direction.

In addition, the scale S may be marked on the outer peripheral surface of the fore-end of the first tube 10 such that a user may adjust the positions of the second and third tubes 20 and 30 according to her/his eyesight. The scale S is used to check the eye prescription of a user with poor eyesight. The prescription of a user with poor eyesight is the mark on the scale that can be read by the user when an image looks clearest by rotating the second tube and moving the positions of the first and second concave lenses and the third and fourth concave lenses.

In addition, the optical device may include caps which are applied to one end surface of the third tube 30 in order to perform at least one of amblyopia training, astigmatism training, and an object reduction function. The caps may be generally divided into a first cap 82 for astigmatism training, a second cap 84 for amblyopia training, and a third cap 86 to which a lens is attached to increase a rate of reduction. Here, two or more caps may be used once for eyesight restoration training as necessary. For example, both the first cap 82 for astigmatism training and the second cap 84 for amblyopia training may be fitted to one end surface of the third tube, and may be then fixed to a portion marked with "0" diopter (1.5 vision) through adjustment. Next, the eyes of the user are focused such that the crosshairs and point of the optical device overlap each other and a single image is formed while the user views a bright window or lamp. This method has an effect of eliminating astigmatism and relieving amblyopia in the state of 1.5 vision.

When the user has astigmatism, the user wears the optical device equipped with the first cap 82 for astigmatism training, and then tries to see the clear and thick crosshairs in the center thereof. In order to relive amblyopia, the user wears the optical device equipped with the second cap 84 for amblyopia training, and then tries to accurately see the point.

In addition, the optical device may further include an eyeglass lens 50 which has an opening portion formed in the central portion thereof such that a portion of the first tube 10 may be inserted into the eyeglass lens 50, and a coupling ring 12 which allows the first tube 10, a portion of which is inserted into the eyeglass lens 50, to be coupled thereto.

As illustrated in FIG. 4, one end of the first tube passing through the opening portion of the eyeglass lens may be formed with a spiral coupling portion so as to be coupled into the coupling ring through the rotation of the first tube.

In addition, the optical device may further include an eyeglass body 70 which is made to be worn on a person's face, and an eyeglass lens fixing unit 60 for fixing the eyeglass lens 50 to the eyeglass body 70.

In addition, the eyeglass lens 50 and the first, second, third, and fourth tubes are formed in pairs, ones of which are respectively located at the left and right of the optical device. The optical device may further include a leveling unit 90 for horizontally fixing the first, second, third, and fourth tubes.

In addition, the second tube 20 may have the same diameter as the third tube 30.

The method of specifically utilizing the optical device for restoring eyesight according to the present invention is as follows. The optical device of the present invention is a device configured to view an object which is a certain distance away, instead of a nearby object. The optical device is adjusted such that one image is formed by moving the lens of the optical device to be suitable for a user's eye and by locating the lens at the center of the eye. After this adjustment, the training for restoring eyesight may be performed in various manners according to the purpose. First, in order for the user to comfortably use the optical device for a long time at the same level as her/his eyesight, the user adjusts the scale S marked on the outer peripheral surface of the first tube for the diopter of her/his eye by rotating the fixing unit 45 in the clockwise or counterclockwise direction, and then looks in the optical device. In this case, since a clear image is seen, the user suffers from low stress. Even though the user views an object at the focal length thereof, the image looks smaller it would if viewed with the naked eye. Thus, since the user has a good eyesight level, the optical device has an effect of accustoming the cerebrum to a small image, and helps to develop ability to look at small images.

In order to train more powerfully, the user performs training for looking farther than the sight distance thereof. The lower the diopter, the longer the focal length is. Accordingly, the user adjusts the scale for a diopter lower than that of her/his eyesight (for example, when the eyesight of the user is 5 diopters, the scale is adjusted to be 3 or 2 diopters) such that a blurry image is formed, and then tries to view the object.

In addition, it is preferable that a user intensively see a smaller image so long as the user sees it. Therefore, when an image smaller than the object that is currently being viewed is required, the cap 86 equipped with the provided lens is attached to one end surface of the third tube such that the object looks small. As such, the user may view the object as though the object is reduced in size.

As is apparent from the above description, when an optical device for restoring eyesight according to the present invention is used, persons with poor eyesight can more conveniently undergo therapy such that an object looks small and far away.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. An optical device for restoring eyesight, comprising:
   a first tube configured such that a first convex lens having a first focal length is installed to an inner peripheral surface of a fore-end thereof;
   a second tube inserted into the first tube so as to move forward and backward within the first tube while a first concave lens having a second focal length and a second concave lens having a third focal length are installed to an inner peripheral surface of a fore-end thereof;
   a third tube configured such that a third concave lens having a fourth focal length and a fourth concave lens having a fifth focal length are installed to an inner peripheral surface of a fore-end thereof;
   a fixing unit for fixing the second tube to the third tube; and
   a fourth tube fixed to the fixing unit to cover the second tube, wherein
   the fourth focal length of the third concave lens installed to the third tube is equal to the fifth focal length of the fourth concave lens, and the third and fourth concave lenses are fixedly installed at a regular interval.

2. The optical device according to claim 1, wherein the first tube has a first coupling portion formed on the inner peripheral surface of the fore-end thereof, and the second tube has a second coupling portion formed on an outer peripheral surface of the fore-end thereof, thereby allowing the first and second tubes to be coupled to each other.

3. The optical device according to claim 2, wherein the second coupling portion protrudes in a spiral direction, and the first coupling portion is a groove for receiving the second coupling portion, protruding in the spiral direction, such that the second tube moves forward and backward within the first tube while rotating in a clockwise or counterclockwise direction.

4. The optical device according to claim 1, wherein the outer peripheral surface of the fore-end of the first tube is formed with a scale such that a user adjusts positions of the second and third tubes according to eyesight thereof.

5. The optical device according to claim 1, further comprising a cap which is applied to one end surface of the third tube in order to perform at least one of amblyopia training, astigmatism training, and an object reduction function.

6. The optical device according to claim 1, further comprising:

an eyeglass lens having an opening portion formed in a central portion thereof such that a portion of the first tube is inserted into the eyeglass lens; and a coupling ring for allowing the first tube, a portion of which is inserted into the eyeglass lens, to be coupled thereto.

7. The optical device according to claim 6, further comprising:

an eyeglass body made to be worn on a user's face; and an eyeglass lens fixing unit for fixing the eyeglass lens to the eyeglass body.

8. The optical device according to claim 7, wherein the eyeglass lens and the first, second, third, and fourth tubes are formed in pairs, ones of which are respectively located at left and right sides of the optical device, and the optical device further comprises a leveling unit for horizontally fixing the first, second, third, and fourth tubes.

9. The optical device according to claim 1, wherein the second tube has the same diameter as the third tube.

* * * * *